No. 657,374. Patented Sept. 4, 1900.
S. T. WILLIAMS.
ROAD MAKING MACHINE.
(Application filed June 27, 1900.)
(No Model.) 2 Sheets—Sheet 1.
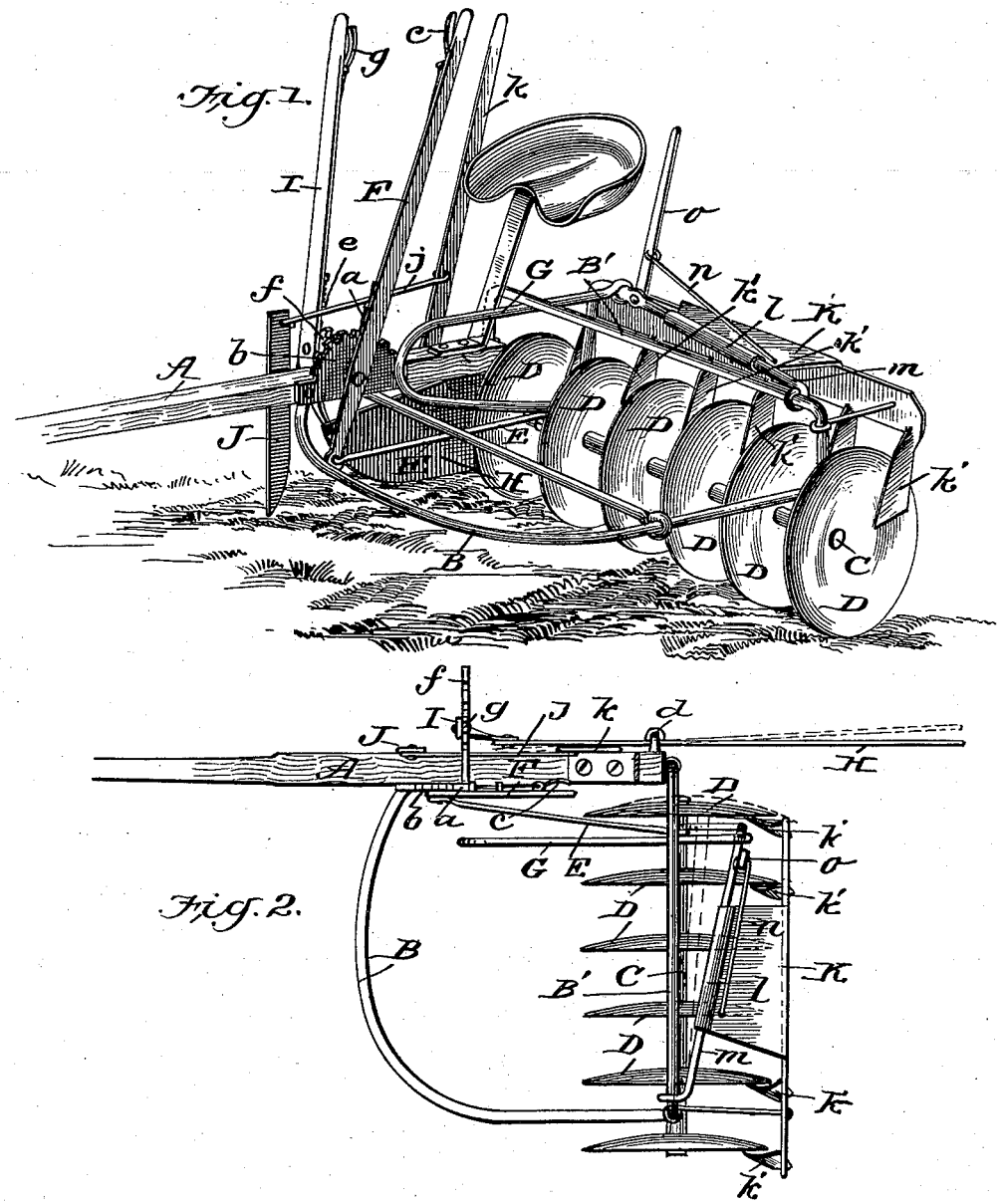
WITNESSES:
Jos. A. Ryan
Edw. W. Byrn.
INVENTOR
S. T. Williams.
BY Munn & Co.
ATTORNEYS
THE NORRIS PETERS CO., PHOTO-LITHO., WASHINGTON, D. C.

No. 657,374. Patented Sept. 4, 1900.
S. T. WILLIAMS.
ROAD MAKING MACHINE.
(Application filed June 27, 1900.)
(No Model.) 2 Sheets—Sheet 2.
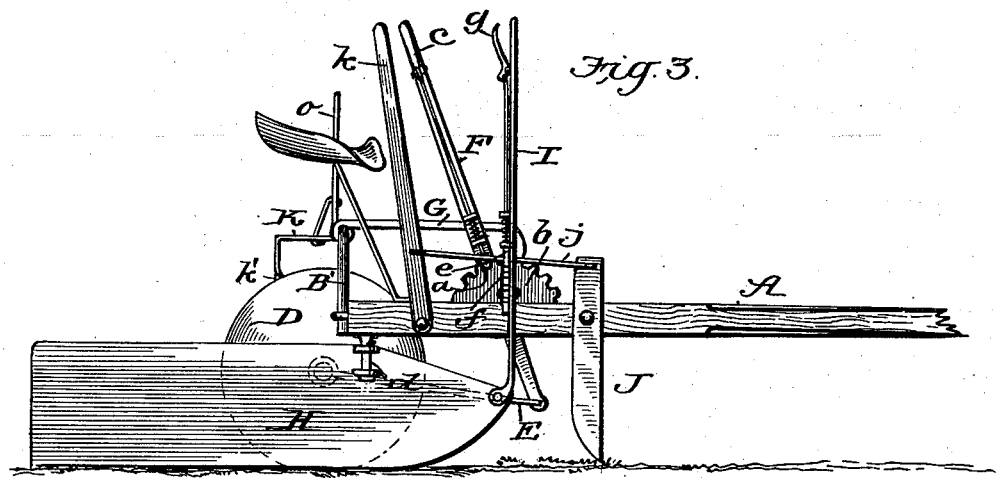
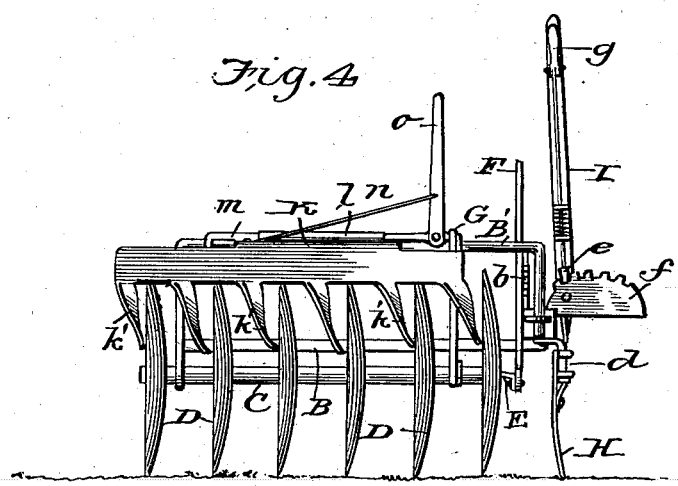
WITNESSES:
Jos. A. Ryan
Edw. W. Byrn
INVENTOR
S. T. Williams
BY Munn & Co.
ATTORNEYS
THE NORRIS PETERS CO., PHOTO-LITHO., WASHINGTON, D. C.

UNITED STATES PATENT OFFICE.

SEPTIMUS T. WILLIAMS, OF BEAVER DAM, KENTUCKY.

ROAD-MAKING MACHINE.

SPECIFICATION forming part of Letters Patent No. 657,374, dated September 4, 1900.

Application filed June 27, 1900. Serial No. 21,825. (No model.)

*To all whom it may concern:*

Be it known that I, SEPTIMUS T. WILLIAMS, of Beaver Dam, in the county of Ohio and State of Kentucky, have invented a new and useful Improvement in Road - Making Machines, of which the following is a specification.

The object of my invention is to provide an improved road-making machine which shall be of very light draft, requiring only about one-half of the team ordinarily used, and which is applicable also for road bedding, ditching, and all sorts of grading. It belongs to that general class of machines in which a gang of concave disk-shaped plows is employed in connection with a scraper-blade; and it consists in the peculiar construction and arrangement of parts and means for adjusting the same, whereby the device is rendered more simple, practical, and efficient, as will be hereinafter more fully described with reference to the drawings, in which—

Figure 1 is a perspective view. Fig. 2 is a plan view, partially broken away. Fig. 3 is a side elevation, and Fig. 4 a rear end view.

In the drawings, A is a tongue to which is rigidly attached a laterally-projecting frame B B', in the rear end of which is journaled one end of the shaft C, bearing the concave disk plows D. The other end of the shaft C is journaled in a swinging draft-bar E, hung at its front end to the lower end of the hand-lever F, fulcrumed to the tongue, and projecting up above it in close proximity to the driver's seat. This lever has a locking-bolt a, engaging with a notched plate b, which locking-bolt connects with a handle c, by which the lever may be adjusted to different angular positions. By means of this lever and the swinging bar E the inner end of the gang of disks may be adjusted forward or backward at any desired angle, as shown by dotted lines in Fig. 2.

To hold the inner end of the gang of disk cutters down to their work and prevent the rear end of the swinging draft-bar from rising, a bowed frame G is erected on the shaft C and projects forward under the overhanging section B' of the main frame, so that the weight of the driver and the weight of the machine rests upon this bowed frame G as a bearing and holds down the cutters, the bowed forward extension playing under the main frame-section B' as the inner end of the gang of disks is adjusted forward or back.

H is a trailing scraper-blade. This is arranged in a vertical plane and nearly in line with the tongue and projecting rearwardly from the same beyond the inner end of the gang of cutter-disks. This scraper is fulcrumed at *d* about a vertical axis and has its front end connected to the lower end of a lever I, which is fulcrumed to the tongue to vibrate in a vertical plane at right angles to the tongue. This lever is provided with a locking-bolt *e*, engaging with a notched plate *f* on the tongue and a handle *g* for operating the locking-bolt and adjusting it to any of the notches. This lever permits the forward end of the scraper-blade to be adjusted to the right or left, as indicated in dotted lines in Fig. 2, to change its inclination to the line of draft. This is rendered desirable by the fact that when the inclination of the gang of disks to the line of draft is changed they alter the lateral thrust or sidewise drift of the machine, and by the adjustment of the inclination of the scraper-blade to suit this the lateral drift may be neutralized, for the scraper-blade is set to throw the machine sidewise in an opposite direction from that in which the disks have a tendency to throw it.

In front of the scraper-blade there is an adjustable colter-blade J, fulcrumed to the tongue and connected above the tongue to a rod *j*, which at its rear end is pivoted to a hand-lever *k*, by which said colter-blade may be thrown into or out of contact with the ground to hold the machine against any unusual lateral stress or to cut a pathway for the scraper.

Immediately over the gang of disk cutters there is mounted an adjustable plate K, having tongues *k'*, that extend down into close contact with concave sides of the disks to dislodge the adhering dirt and clay. These scrapers are all simultaneously adjusted by a tubular guide-sleeve *l* on a fixed rod *m*, attached to the framework, and a link *n* and lever *o*, by which the scraper-plate is adjusted back and forth on said rod to throw the scraper-tongues to or from the disks.

In constructing my machine it may be made either as a right or left hand machine and of any desired size.

Having thus described my invention, what I claim as new, and desire to secure by Letters Patent, is—

1. A road-machine consisting of a tongue, and laterally-projecting framework, a gang of disk-shaped cutters journaled at the outer end in said framework, a swinging draft-bar, with locking and adjusting devices, attached to the inner end of the gang of cutters, and a forwardly-projecting pressure-bearing attached to the inner end of the gang of cutters and moving freely under a portion of the framework to hold the inner end of the cutters down to their work substantially as described.

2. A road-machine having a trailing scraper-blade fulcrumed about a vertical axis and having a hand-lever, with locking devices, connected to the front end of the scraper-blade for adjusting it to an angle to the line of draft substantially as described.

3. In a road-machine, the combination with the framework; of a gang of disk-shaped cutters made adjustable as to their angle of inclination to the line of draft, and a trailing scraper-blade fulcrumed about a vertical axis on the opposite side from the said gang and made adjustable as to inclination to the line of draft to neutralize the lateral thrust of the gang of disk cutters substantially as described.

In testimony whereof I have signed my name to this specification in the presence of two subscribing witnesses.

SEPTIMUS T. WILLIAMS.

Witnesses:
E. P. BARNES,
C. P. AUSTIN.